United States Patent [19]

Thiele et al.

[11] Patent Number: 5,322,068

[45] Date of Patent: Jun. 21, 1994

[54] METHOD AND APPARATUS FOR DYNAMICALLY STEERING ULTRASONIC PHASED ARRAYS

[75] Inventors: Karl E. Thiele, Andover; Ann Brauch, North Andover, both of Mass.

[73] Assignee: Hewlett-Packard Company, Palo Alto, Calif.

[21] Appl. No.: 65,958

[22] Filed: May 21, 1993

[51] Int. Cl.⁵ .............................................. A61B 8/00
[52] U.S. Cl. ................................ 128/661.01; 73/625
[58] Field of Search ............... 128/660.01, 660.07, 128/661.01; 73/620, 626, 625

[56] References Cited

U.S. PATENT DOCUMENTS

| | | | |
|---|---|---|---|
| 4,149,420 | 4/1979 | Hutchinson et al. | 73/626 |
| 4,155,259 | 5/1979 | Engeler | 73/626 |
| 4,159,462 | 6/1979 | Rocha et al. | 340/1 R |
| 4,180,790 | 12/1979 | Thomas | 367/7 |
| 4,180,792 | 12/1979 | Lederman et al. | 367/7 |
| 4,235,111 | 11/1980 | Hassler | 73/626 |
| 4,241,610 | 12/1980 | Anderson | 73/626 |
| 4,276,779 | 7/1981 | Davis, Jr. | 73/626 |
| 4,290,310 | 9/1981 | Anderson | 73/626 |
| 4,310,907 | 1/1982 | Tachita et al. | 367/11 |
| 4,344,327 | 8/1982 | Yoshikawa et al. | 73/626 |
| 4,368,643 | 1/1983 | Tachita et al. | 73/626 |
| 4,440,025 | 4/1984 | Hayakawa et al. | 73/642 |
| 4,459,853 | 7/1984 | Miwa et al. | 73/626 |
| 4,470,308 | 9/1984 | Hayakawa et al. | 73/642 |
| 4,528,854 | 7/1985 | Shimazaki | 73/626 |
| 4,550,607 | 11/1985 | Maslak et al. | 73/626 |
| 4,561,308 | 12/1985 | Bele et al. | 73/626 |
| 4,567,897 | 2/1986 | Endo et al. | 128/660 |
| 4,569,231 | 2/1986 | Carnes et al. | 73/626 |
| 4,611,494 | 9/1986 | Uchiyama | 73/626 |
| 4,638,467 | 1/1987 | Takeuchi | 367/105 |
| 4,644,795 | 2/1987 | Augustine | 73/625 |
| 4,649,927 | 3/1987 | Fehr et al. | 128/661 |
| 4,691,570 | 9/1987 | Hassler | 73/626 |
| 4,722,345 | 2/1988 | Ueno et al. | 128/660 |
| 4,893,283 | 1/1990 | Pesque | 367/7 |
| 4,915,115 | 4/1990 | Sasaki et al. | 128/660 |
| 4,937,797 | 6/1990 | Snyder et al. | 367/138 |
| 4,949,259 | 8/1990 | Hunt et al. | 364/413 |
| 5,005,419 | 4/1991 | O'Donnell et al. | 73/626 |
| 5,027,820 | 7/1991 | Pesque | 128/660.07 |
| 5,072,735 | 12/1991 | Okazaki et al. | 128/660.07 |
| 5,123,415 | 6/1992 | Daigle | 128/661 |
| 5,148,810 | 9/1992 | Maslak et al. | 128/661 |
| 5,184,623 | 2/1993 | Mallart | 128/661.01 |

FOREIGN PATENT DOCUMENTS

0442450A2  8/1991  European Pat. Off. ....... 128/661.01

Primary Examiner—William E. Kamm
Assistant Examiner—George Manuel

[57] ABSTRACT

A phased array ultrasonic imaging system including a transducer array for transmitting pulses of ultrasound energy in a transmitting mode and for receiving reflected ultrasound energy in a receiving mode, a transmit control circuit, coupled to and controlling the transducer array, for selecting an angle and a focus to steer a transmitted pulse of ultrasound energy in a desired direction in the transmitting mode, and a receive focusing circuit, coupled to the transducer array, for dynamically varying a receive steering angle and focus in real time during reception of ultrasound energy to focus the received ultrasound energy along at least one virtual scan line that is not required to pass through a center of mass of an applied apodization function. The at least one virtual scan line may originate at a virtual apex that is disposed at a location other than on a face of the transducer array.

20 Claims, 6 Drawing Sheets

METHOD AND APPARATUS FOR DYNAMICALLY STEERING ULTRASONIC PHASED ARRAYS

FIELD OF THE INVENTION

The present invention relates generally to the field of ultrasonic imaging apparatus for medical diagnostic purposes. More particularly, the present invention relates to methods and apparatus for dynamically steering and focusing a received ultrasound signal during reception of the signal. The present invention can provide a virtual apex behind a transducer array in order to provide a wider field of view in the near field or can provide a virtual apex in front of the transducer array, i.e., below the patient's skin line.

DISCUSSION OF THE RELATED ART

Phased array ultrasonic imaging systems that perform sector scanning utilizing a linear array of transducers are known in the art to comprise a linear array of transducers wherein individual transducers are activated at different times with respect to each other so as to transmit a radial scan beam in a predetermined direction. The relative delay times used to determine the activation of each transducer are successively varied so that the radial beam is angularly steered across the sector scan field. Conventionally, this sector scan field has an origin point located on the surface of the transducer array such that the near field is represented in a substantially triangular, pointed format, as illustrated in FIG. 1. As shown in FIG. 1, an array of transducers 10 (that is coupled to an ultrasonic transmitting and receiving system), includes a plurality of transducers $12_i$ where i varies from 1 to n. Typical sector scanned phased array transducer arrays use from 64 to 128 elements. Transducer array 10 is placed in contact with a patient's body at a skin line 14. Pulses of ultrasonic energy are transmitted into the patient's body along scan lines $16_i$ where i varies from 1 to m. An image is formed by respectively delaying the signals which represent the reflected ultrasound energy received by each transducer element $12_i$ at a number of points along scan lines $16_i$ so that signals representing the reflected ultrasound energy from a focal point to a particular transducer element add constructively to produce images along scan lines $16_i$ from the near field to the far field. An example of this type of phased array ultrasonic imaging system is disclosed in U.S. Pat. No. 4,140,022, the disclosure of which is hereby incorporated by reference.

As FIG. 1 illustrates, the field of view in the near field, i.e., close to the patient's skin line, is limited by the point source origin of the sector scan field at the surface of the transducer.

The prior art contains several approaches directed to improving the field of view in the near field. A simple approach is to scan through a water-filled bag used as a stand-off from the skin surface. The effect of this approach is to offset the origin of the field from the surface of the skin, thereby effectively truncating the triangular sector and creating a broader field of view at the skin surface. However, image resolution at increasing depths is compromised, as the depths from the scanning transducer are increased by the thickness of the water-filled bag.

Another approach is to activate the transducers of a successively selected, laterally shifting group of transducers of a linear array such that the transmitted beams form a sector scan field of which the origin point is located behind the transducer array. This technique is described in U.S. Pat. No. 4,368,643 and offers a simplification of the scan converter necessary to process the returned echo signals for a visual display. Each subaperture produces its own radial scan line having a unique steer angle. This steer angle is the same angle that would be produced by a radial scan line originating from the virtual apex behind the face of the transducer.

U.S. Pat. No. 5,123,415 also uses lateral shifting of subapertures across the face of the transducer array. To provide improved resolution throughout areas of a trapezoidal sector field, the angles of successive radial scanning beams are incremented in substantially equal angular increments relative to the linear array across the sector scan field. Upon receive, a delay circuit inhibits the reception of signal components from laterally disposed transducer elements in the array until the reception of echo signals from increasing depths so as to expand the aperture of the array in concert with the reception of echo signals from increasing depths. Dynamic focusing may be provided by varying the frequency at which laterally disposed echo signals are sampled over the depth of field.

The use of laterally shifting subapertures along the transducer array is also used in the system disclosed in U.S. Pat. No. 5,148,810. In that system, subsets of transducer elements are selectively activated to form a radial scan line. The subsets of transducer elements may include adjacent transducer elements or other groupings such as every other one of the transducer elements. The scan line is defined by a line connecting the focus point to the "center-of mass" of the apodization function of the transducer aperture.

All of the above approaches involve the use of shifting subapertures that are smaller than the full aperture of the transducer array to perform virtual apex scanning. Therefore, the systems do not produce the best images in situations where a larger aperture is needed. For example, in the far field, a larger aperture is required for detailed resolution of deeper structures. Although dynamic apodization might mitigate this limitation, the scan lines at the edge of the sector would still be degraded by the clamping effect caused by the limitations of the physical probe aperture.

In addition, the scan line used in the above approaches must pass through the apodization function center of mass. Thus, the apodization profiles that can be practically used are somewhat limited. For example, asymmetrical apodization profiles will affect the available steer angle of the beam.

SUMMARY OF THE INVENTION

The present invention overcomes the limitations of the prior art by providing a phased array ultrasonic imaging system including a transducer array for transmitting pulses of ultrasonic energy in a transmitting mode and for receiving reflected ultrasonic energy in a receiving mode and a transmit control circuit, coupled to and controlling the transducer array for selecting an angle and a focus to steer a transmitted pulse of ultrasound energy in a desired direction in the transmitting mode. The ultrasonic imaging system of the invention also includes a receive focusing circuit, coupled to the transducer array, for dynamically varying a receive steering angle and focus in real time during reception of ultrasound energy to focus the received ultrasound energy along at least one virtual scan line that is not required to pass through a center of mass of an applied apodization function. The receive focusing circuit may vary the receive steering angle continuously during reception or in discrete increments corresponding to zones along the at least one virtual scan line.

The at least one virtual scan line may originate at a virtual apex that may be disposed in front of or behind the face of the transducer array. The actual scan lines which generate the virtual scan lines have fixed origins that are typically located at the center of the transducer array. The center of mass of the apodization function remains fixed, typically at the center of the transducer array, during scanning, and shifting subapertures are not required. Each virtual scan line is defined by a locus of focal points created by dynamically steering and focusing these actual scan lines. Arbitrary apodization profiles in the transmitting and reception modes may be used. Dynamic apodization in receive mode may be used. Means may also be provided for compensating for an apparent increase in the speed of sound of the received ultrasound energy in the direction along the virtual scan line originating at the virtual apex.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein by reference and in which like elements have been given like reference characters.

DETAILED DESCRIPTION

Prior to explaining in detail an implementation of the present invention, an overall explanation of the operation of the present invention will be given. In conventional ultrasound sector imaging systems, a sector image is formed by transmitting a scan line from an apex generally disposed at a center of a face of the array and having a particular steering angle. During reception, the received ultrasound scan line is typically steered along the same trajectory as the transmitted scan line. As the ultrasound energy is received, dynamic focusing is used to focus the received ultrasound energy along the trajectory of the received scan line from the near field to the far field. By contrast, the present invention uses the full transducer aperture and dynamic variation of delays during reception of ultrasound energy to focus along a virtual scan line that is not necessarily straight and that does not necessarily pass through a center of mass of the apodization function. In effect, the present invention establishes the virtual scan line by dynamically varying both the received steering angle and focal point so that the focal points lie along the virtual scan line. Furthermore, although the inventive method will be explained hereinafter as implemented in an analog ultrasound system, one skilled in the art will appreciate that the principles of the present invention are fully applicable to an ultrasonic imaging system which uses digital techniques for beam forming.

Figure 1:
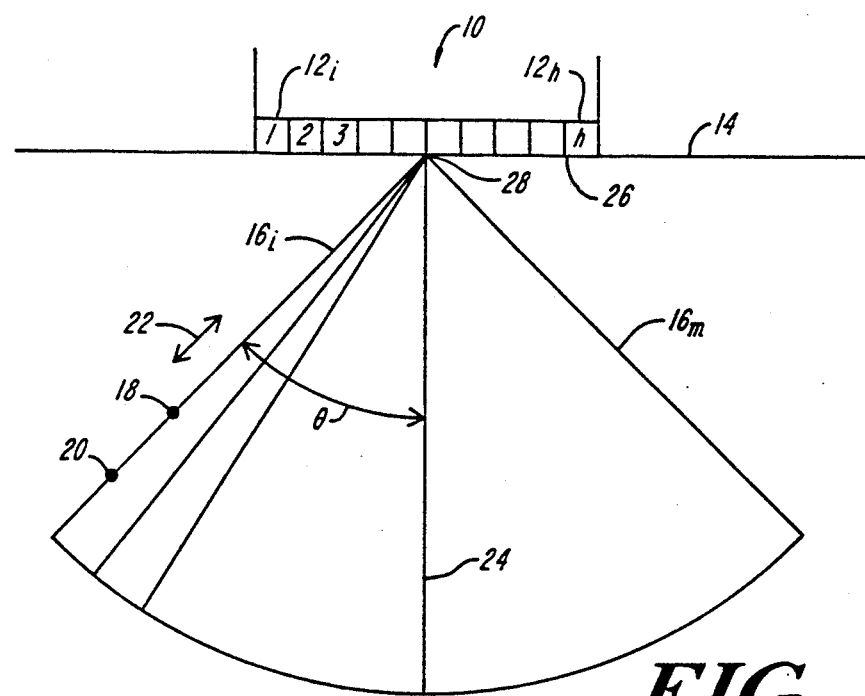
FIG. 1 is a view of the image plane of a conventional sector scanned image format.

Referring again to FIG. 1, in accordance with the sector scanning system described in U.S. Pat. No. 4,140,022, during transmission, each scan line $16_i$ is typically focused at a transmit focal point 18. When receiving along a scan line $16_i$, focusing typically includes two types of operations. First, a tap on a delay circuit, such as a summing delay line, is selected to provide a target focal point along line $16_i$. The focal point may be located at, for example, point 20. Focal point 20 is not necessarily located at focal point 18. Thereafter, phases of a clock signal are used to finely adjust the coarse focus established by the summing delay line to provide dynamic focusing along scan line $16_i$ in the directions of arrow 22.

An angle $\theta$ describes the angle between scan line $16_i$ and a line 24 normal to the face 26 of transducer array 10. A received scan line along line 24 is used as a reference line and all other received scan lines must be delayed with respect to line 24 as a function of the angle $\theta$ so that the image is properly focused. The ultrasound signals transmitted from and received by individual transducer elements are delayed with respect to each other so that the ultrasound image is centered around an apex 28 generally located at a center of a face 26 of transducer array 10.

Figure 2:
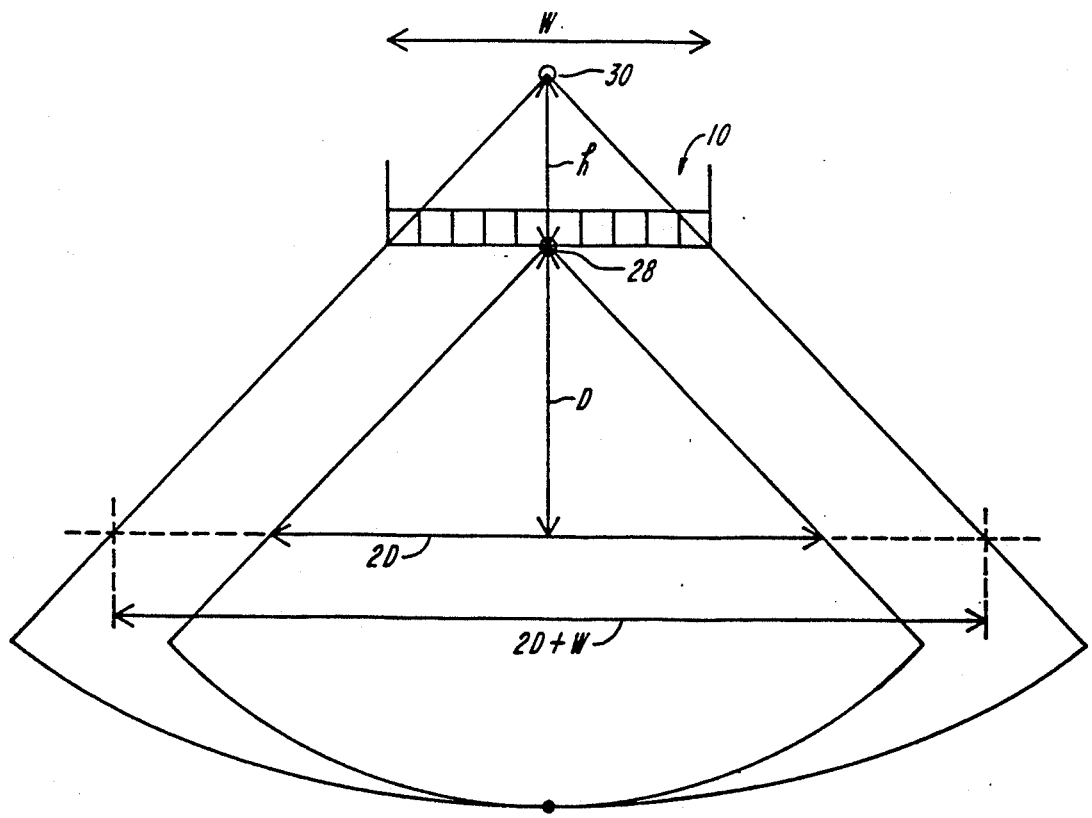
FIG. 2 is a view of the image plane using virtual apex scanning of a sector scanned image.

Reference is now made to FIG. 2, which illustrates one example of the increased field of view provided by the virtual apex scanning method of the present invention when the virtual apex is located behind the face of transducer array 10. As illustrated in FIG. 2, when the apex 28 is located at the center of transducer array 10, a 90° sector image formed by scan lines $16_i$ during reception of reflected ultrasonic energy has a width, or field of view, equal to 2D at a depth D. On the other hand, if the apex is moved back a distance h, where h=W/2, to a location 30 behind transducer array 10, then at the same depth D, the field of view will have a width equal to 2D plus W, where W is the length of the transducer array. This relationship holds for all depths D.

Figure 3A:
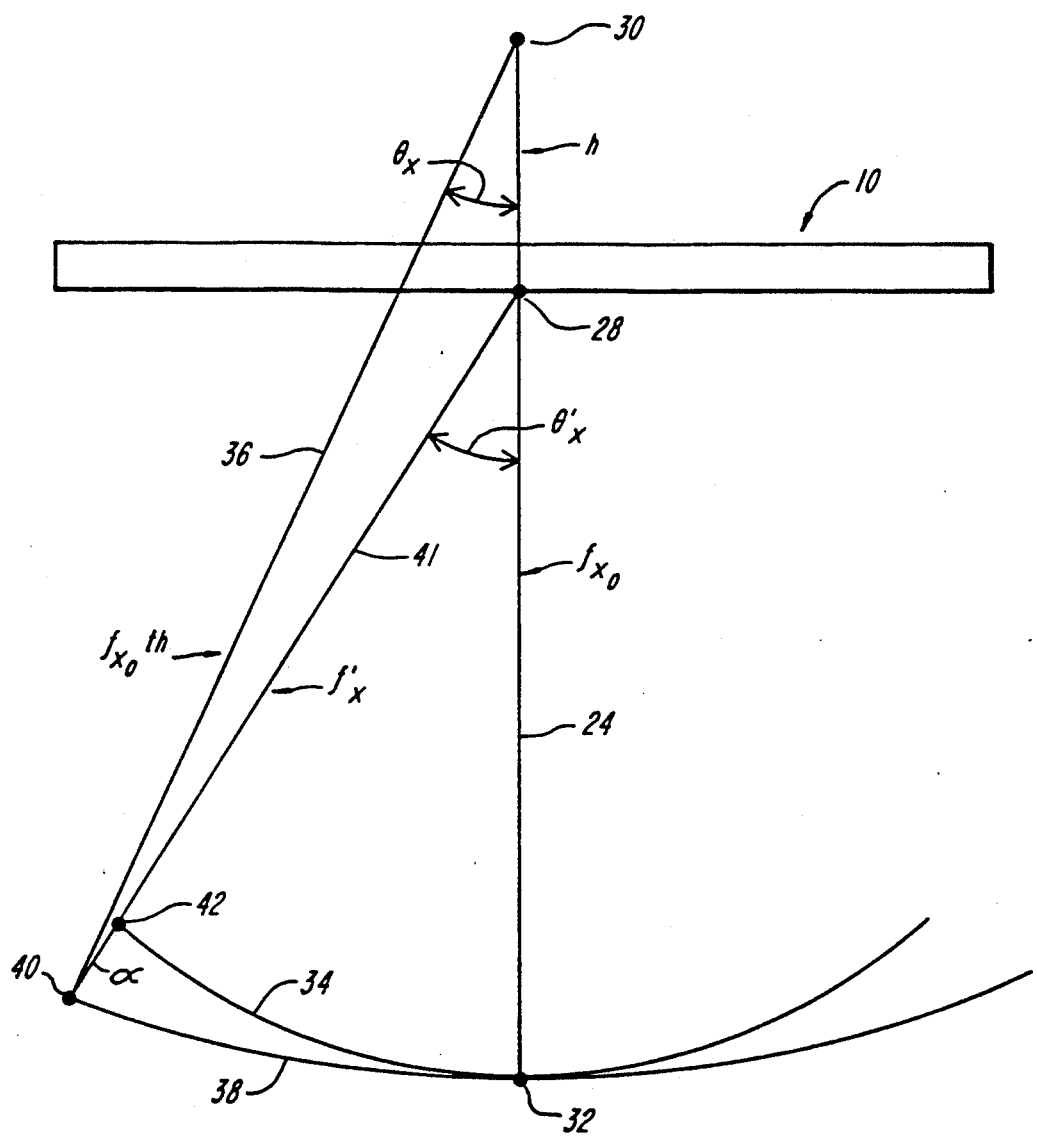
FIGS. 3A and 3B illustrate a single scan line and a single virtual scan line in the image plane using virtual apex scanning in accordance with the invention wherein the apex is located behind the face of the transducer array.
Figure 3B:
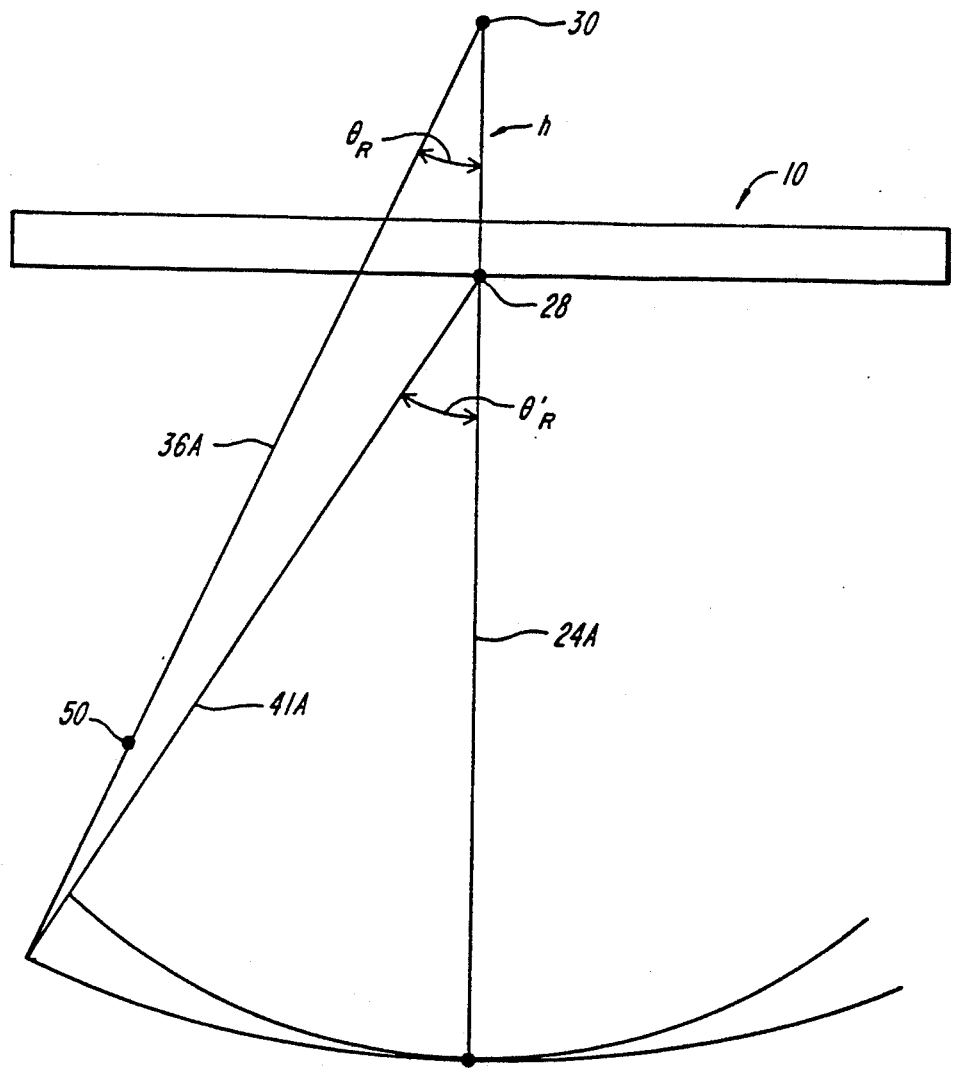

Reference is now made to FIGS. 3A and 3B, which illustrate various geometrical relationships of importance in virtual apex scanning in accordance with the present invention.

Considering first the transmit mode as shown in FIG. 3A, the distance $f_{x0}$ represents an initial focus depth during transmit from an apex 28 to a focal point 32. As transmitted scan line 24 is moved in angular increments about apex 28 through an angle $\theta_x'$, arc 34 represents the locus of a number of radially equivalent focus points. When apex 28 is displaced behind transducer 10 by a distance h to virtual apex 30, a line 36 represents the distance between virtual apex 30 and transmit focal point 32, equal to $f_{x0}+h$. As line 36 is incremented through angles $\theta_x$, arc 38 represents a locus of points having equal radial distance from virtual apex 30. Thus, line 36 will have an associated focal point located at point 40, rather than point 42. The difference in focal points, $\alpha$, corresponds to a time of flight difference between a transmitted ultrasound pulse emanating from apex 28 and a pulse emanating from virtual apex 30. The displacement $\alpha$ is equal to $$f_x' - f_{x0}$$

where:

$f_{x0}$ = a focus depth for a transmitted scan line originating at apex 28

$f_x'$ = is a focus depth for a line originating at the virtual apex 30 but that is actually transmitted from apex 28

As illustrated in FIG. 3A, the difference $\alpha$ increases with increasing values of $\theta_x$ and $\theta_x'$.

Since the ultrasound pulses are actually transmitted from the face of transducer array 10 and centered about apex 28, the following equations are used to compensate for the difference in angle and distance to the focal point from virtual apex 30:

$$f_x' = [(f_{x0}+h)^2 + h^2 - 2(f_{x0}+h)h \cos \theta_x]^{\frac{1}{2}} \quad (1)$$

$$\sin \theta_x' = \frac{(f_{x0}+h)}{f_x'} \sin \theta_x \quad (2)$$

where:

$f_x'$ = a corrected focus depth for a line originating at the virtual apex 30 but that is actually transmitted from apex 28

$f_{x0}$ = a focus depth for a transmitted scan line originating at apex 28 h = a displacement of the virtual apex 30 from apex 28

$\theta_x$ = a steering angle between scan line 24 and line 36

$\theta_x'$ = a corrected steering angle for a transmitted scan line originating at apex 28.

Reference is now made to FIG. 3B, which figure illustrates the geometrical relationships for virtual apex scanning when receiving reflected ultrasound waves. In FIG. 3B, $\theta_R$ is a steering angle between received scan line 24A and received virtual scan line 36A. $\theta_R'$ is a corrected steering angle for a received scan line arriving at apex 28. In accordance with the ultrasound scanning system described in U.S. Pat. No. 4,140,022. $\theta_R$ and $\theta_R'$ are determined by a total delay that is composed of a coarse delay ($\theta_T$ and $\theta_T'$, respectively) provided by a summing delay line and a fine delay ($\theta_p$ and $\theta_p'$, respectively) provided by a phase delay such that $\theta_R = \theta_T + \theta_p$ and $\theta_R' = \theta_T' + \theta_p'$. A tap selector on a summing delay line is used to establish the coarse focal point 50 along a received virtual scan line 36A which connects between virtual apex 30 and the target focal point 50. As illustrated in FIGS. 3A and 3B, the transmit focal point and the receive focal point are not necessarily at the same location. The selection of a particular time delay profile generally determines the received steering angle and target focal point. To establish target focal point 50, the following corrections must be made to the equation for choosing a particular tap selector, since the received ultrasound signals actually arrive centered about apex 28 and not virtual apex 30:

$$f_T' = [(f_{T0}+h)^2 + h^2 - 2(f_{T0}+h)h \cos \theta_T]^{\frac{1}{2}} \quad (3)$$

$$\sin \theta_T' = \frac{(f_{T0}+h)}{f_T'} \sin \theta_T \quad (2)$$

where:

$f_T'$ = a corrected tap selector focus depth (i.e., a time delay) for a received virtual scan line arriving at the virtual apex 30 but that actually arrives at apex 28

$f_{T0}$ = a tap selector focus depth for a received scan line arriving at apex 28 h = a displacement of the virtual apex 30 from apex 28

$\theta_T$ = the portion of $\theta_R$ provided by a time delay for determining a steering angle between received scan line 24A and received virtual scan line 36A $\theta_T'$ = the portion of $\theta_R'$ provided by a time delay for determining a corrected steering angle for a received scan line arriving at apex 28.

Also in accordance with U.S. Pat. No. 4,140,022, a phase delay to be used for fine focus and dynamic focusing of the received ultrasound signal is provided by correcting the phase delay that would normally be provided along received scan line 41A so that the focus occurs along virtual scan line 36A according to:

$$f_p' = [(f_{p0}+h)^2 + h^2 - 2(f_{p0}+h)h \cos \theta_p]^{\frac{1}{2}} \quad (5)$$

$$\sin \theta_p' = \frac{(f_{p0}+h)}{f_p'} \sin \theta_p \quad (6)$$

where:

$f_p'$ = a corrected phase delay for a received virtual scan line arriving at the virtual apex 30 but that actually arrives at apex 28

$f_{p0}$ = a phase delay for a received scan line arriving at apex 28 h = a displacement of the virtual apex 30 from apex 28

$\theta_p$ = the portion of $\theta_R$ provided by a phase delay for determining a steering angle between received scan line 24A and received virtual scan line 36A $\theta_p'$ = the portion of $\theta_R'$ provided by a phase delay for determining a corrected steering angle for a received virtual scan line arriving at virtual apex 30.

As noted before, there is a difference in time of flight between a transmitted scan line arriving at a focal point from apex 28 and a transmitted virtual scan line arriving at the same focal point from virtual apex 30. This difference increases with increasing angles of $\theta$. To compensate for this difference, when receiving reflected ultrasound signals, the start of reception of signals must be updated with changes in $\theta$. Alternatively, the transmitter drive circuitry which causes the transducer elements to transmit an ultrasound signal can be retimed to be activated earlier than they normally would be such that an ultrasound pulse emanating from the center transducer array element always arrives at a focal depth defined by arc 38 in a manner independent of the steering angle $\theta_x$. By symmetry, the same problem occurs when an ultrasound signal is received during virtual apex scanning. A convenient way to compensate for the difference in time of flight in both transmit and receive modes is to adjust the transmitter activation time relative to other transducer elements according to $$\Delta T_x = \frac{1}{C}[(f_x{}' - f_{xo}) + (f_T{}' - f_{To})] \quad (7)$$

where:
$\Delta T_x$ = the transmit advance time required for a transducer element as a function of steering angle
C = velocity of sound in tissue (0.154 cm/usec)

Figure 4A:
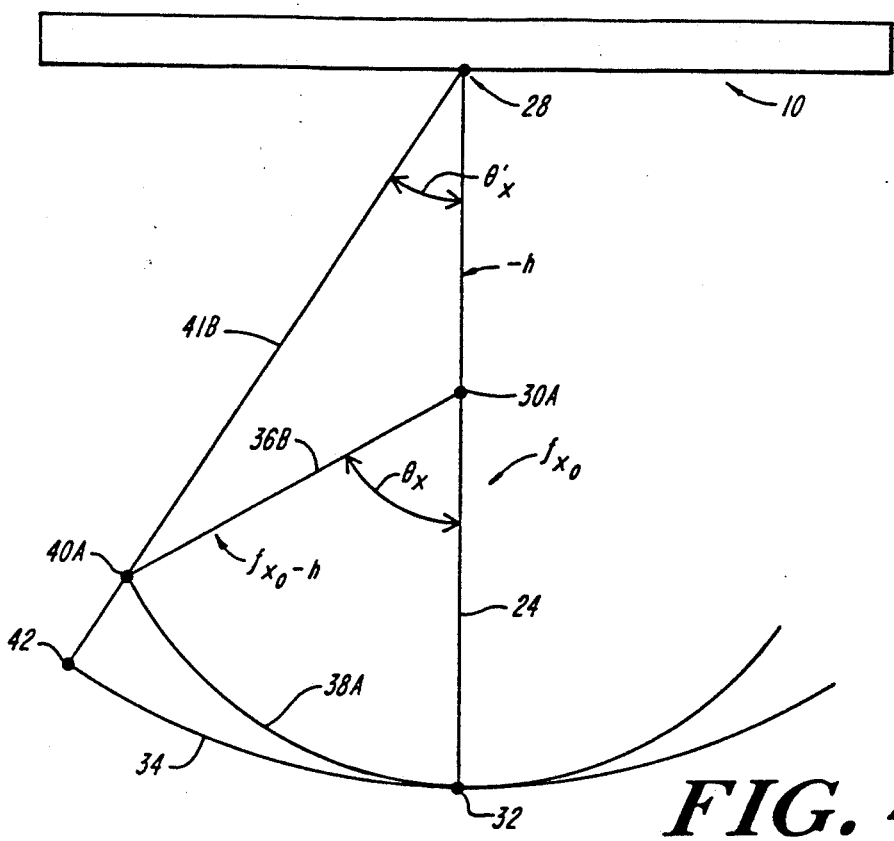
FIGS. 4A and 4B illustrate a single scan line and a single virtual scan line in the image plane using virtual apex scanning in accordance with the invention wherein the apex is in front of the transducer array.
Figure 4B:
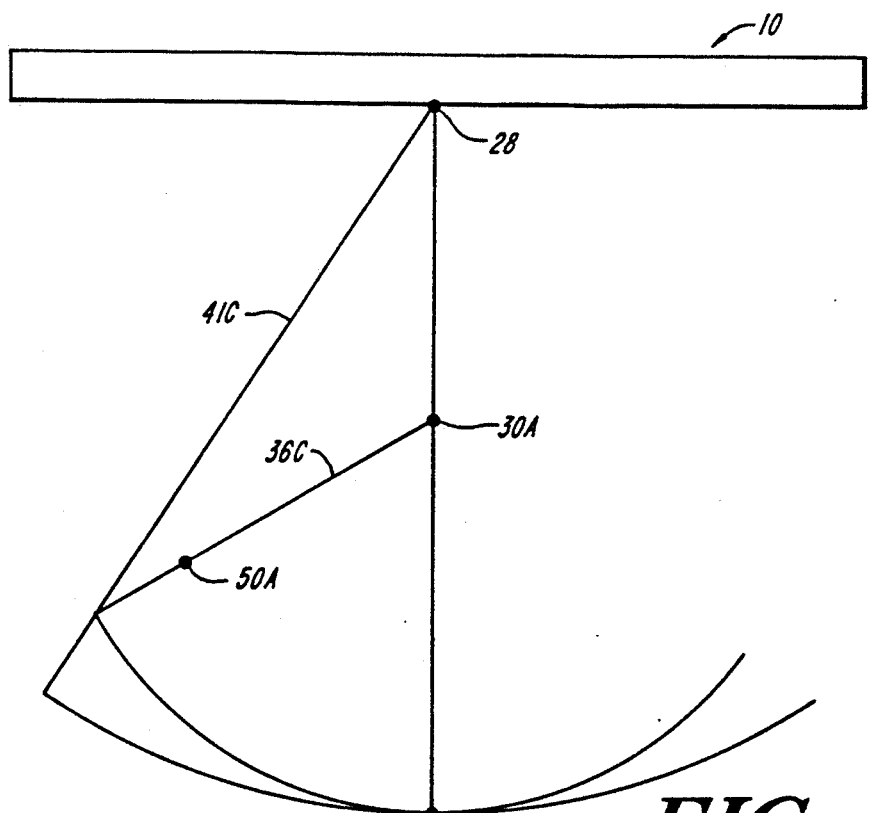

Reference is now made to FIGS. 4A and 4B, which figures illustrate the geometrical relationships that apply when the virtual apex is located in front of the face of the transducer, i.e., below the skin line. This type of virtual apex scanning may be useful when imaging, for example, through the intercostal spaces because it may reduce the shadowing effects created by the ribs. All of the analysis and correction factors described in connection with FIGS. 3A and 3B applies with equal force to a virtual apex below the skin line. The only difference is that the sign of h is made negative to reflect displacement of the virtual apex in front of the transducer array.

Figure 5A:
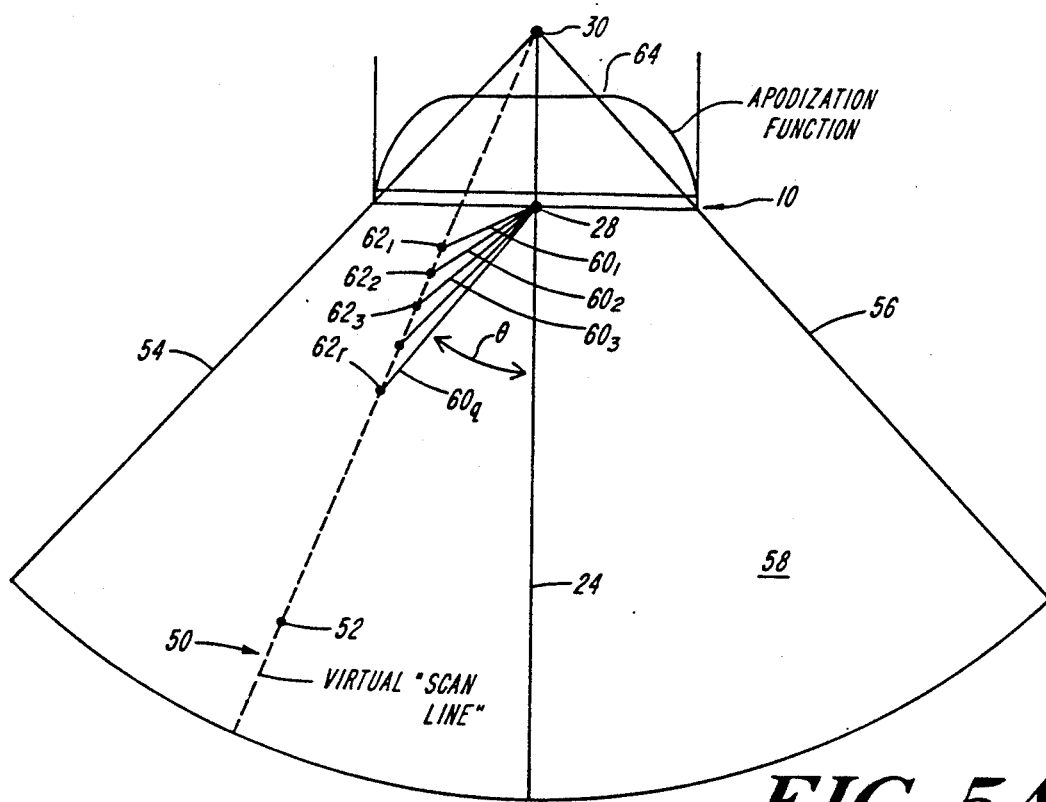
FIG. 5A illustrates a single scan line in the image plane generated using dynamic steering and dynamic focusing in accordance with the invention to focus along a virtual scan line originating at the virtual apex.

With these principles in mind, reference is now made to FIG. 5A, which figure illustrates dynamic steering and dynamic focusing during reception of ultrasound signals in accordance with the principles of the present invention. In FIG. 5A, a virtual scan line 50 is created between virtual apex 30 and focal point 52. Virtual scan lines 54 and 56 represent the boundaries of an increased field of view sector 58. By dynamically adjusting the angle $\theta$ during reception of ultrasound energy and dynamically focusing along each of the multiple actual scan lines $60_i$, where i varies from 1 to q at respective focal points $62_i$ where i varies from 1 to r, the present invention produces a locus of focal points $62_i$ lying on any virtual scan line such as virtual scan line 50. Although q and r are the same for the case illustrated in FIG. 5A, this is not required. One skilled in the art will appreciate that focusing along virtual scan line 50 may be done continuously or in discrete increments or zones along the scan line. As also illustrated in FIG. 5A, unlike prior art systems, the virtual scan line does not have to pass through the center of mass of the applied apodization function. For example, in FIG. 5A, an apodization profile 64 has been applied to the elements of the transducer array. The center of mass of this apodization function lies at apex 28, but virtual scan line 50 does not pass through this center of mass. The present invention is able to accommodate any arbitrary apodization profile in receive and transmit modes. For example, asymmetrical apodization (static or dynamic) profiles may be used.

The present invention also allows the entire width of the array to be used as an aperture when performing virtual apex scanning. This provides for significantly improved images when trying to resolve structural details in the far field.

Figure 5B:
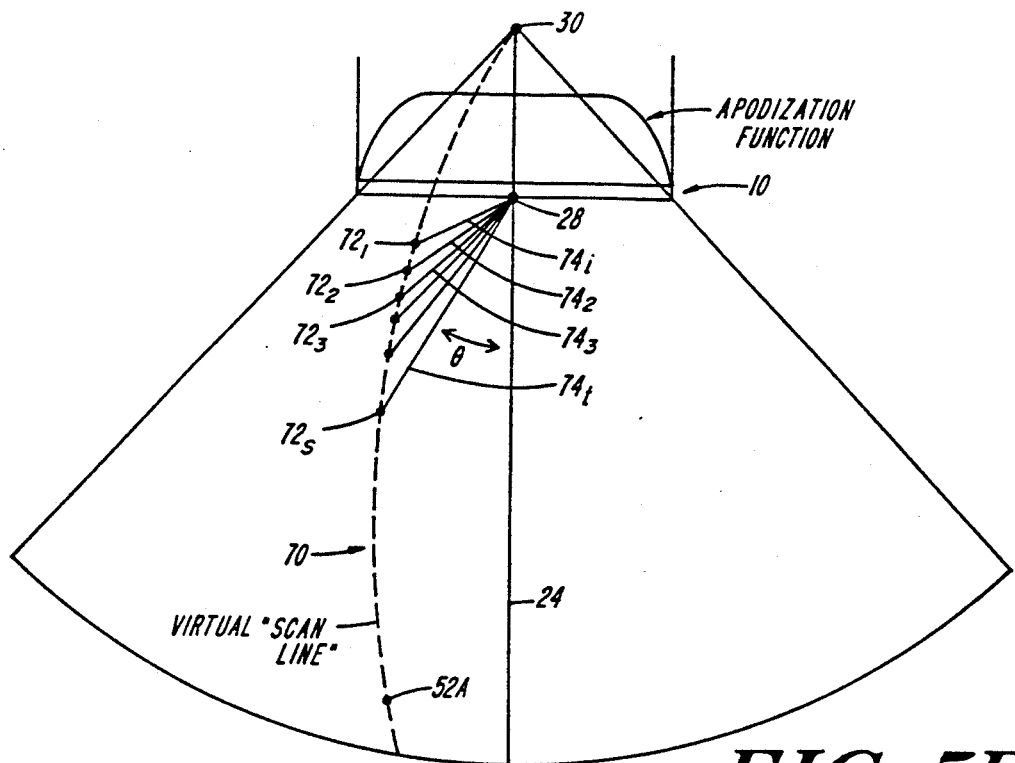
FIG. 5B illustrates a single scan line in the image plane generated in accordance with the present invention using dynamic steering and dynamic focusing along a virtual scan line originating from the virtual apex wherein the virtual scan line is not a straight line.

Reference is now made to FIG. 5B, which figure illustrates operation of the present invention to focus along a virtual scan line 70 that is not straight. In the same manner as described in conjunction with FIG. 5A, a receive steering angle $\theta$ and a receive focal point $72_i$ where i varies from 1 to s, are respectively and dynamically varied for each received actual scan line $74_i$ where i varies from 1 to t during reception of ultrasound energy to produce a locus of focal points, thus allowing acoustic interrogation along curved virtual scan line 70. Although s and t are the same for the case illustrated in FIG. 5B, this is not required.

As will be explained in detail hereinafter, dynamic steering and focusing during reception in a phased array ultrasound imaging system is achieved by varying the clock phases applied to a mixer which produces not only the fine delay necessary for dynamic focusing, but also varies the receive angle $\theta$.

Figure 6:
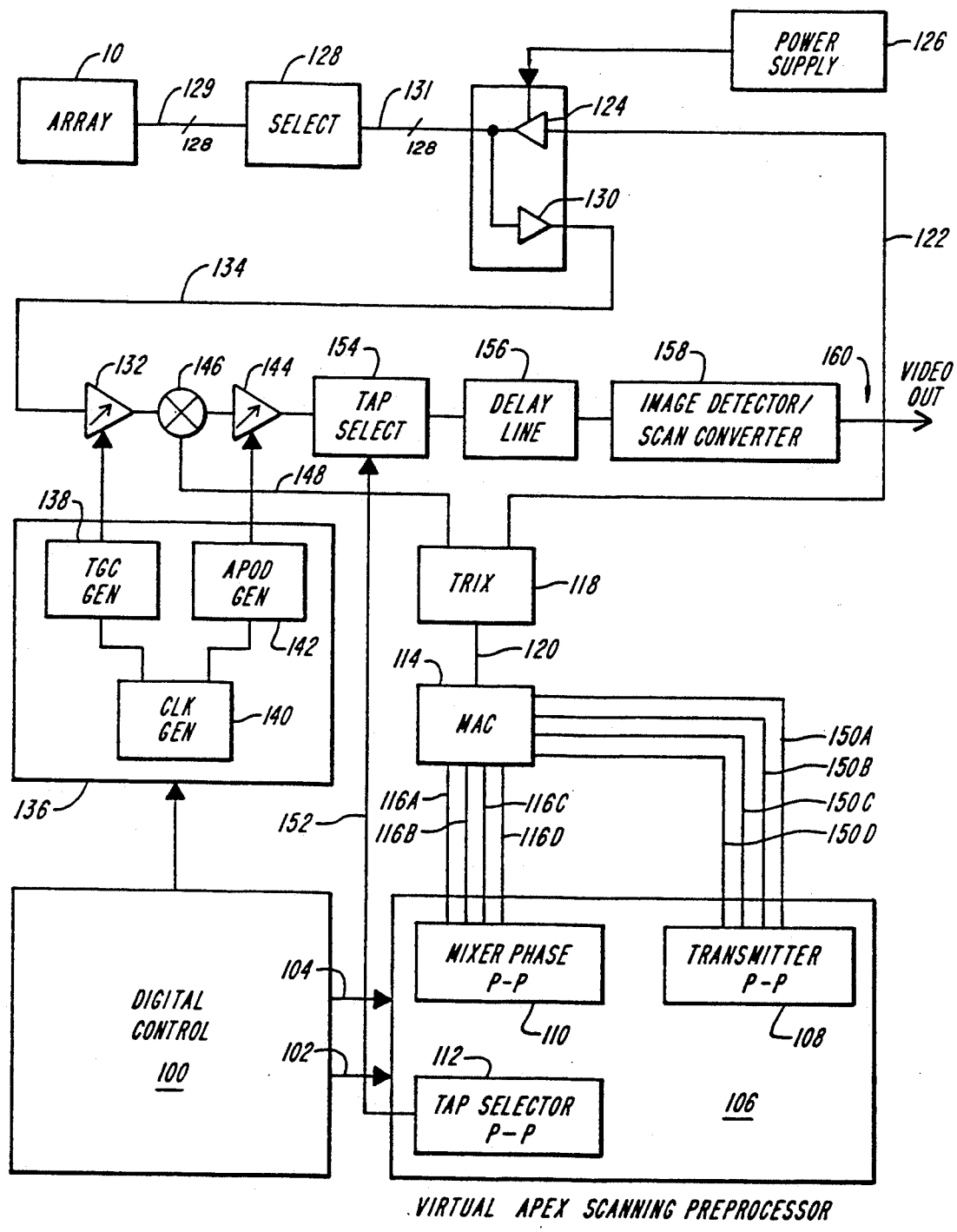
FIG. 6 is a block diagram of an architecture of an ultrasound scanning system capable of performing virtual apex scanning in accordance with the present invention.

Reference is now made to FIG. 6, which figure illustrates, in block diagram form, one example of an architecture of an ultrasonic imaging system that can perform dynamic steering and dynamic focusing during reception of ultrasound signals. The architecture of FIG. 6 is based upon the principles of U.S. Pat. No. 4,140,022 and employs a so called mix and delay (i.e., fine delay added to coarse delay) mechanism for focusing and steering. The block diagram of FIG. 6 is a modification of the architecture used in the Sonos 1000 ultrasonic imaging system manufactured by Hewlett Packard Company.

During transmission of ultrasonic energy, digital control unit 100, which unit may be a microprocessor and associated memory, sends a displacement h indicating the distance between a desired virtual apex 30 and an actual apex 28 on the transducer array over connection 102 to a virtual apex scanning preprocessor 106. A positive value of h indicates that the virtual apex is located behind the transducer array and a negative value of h indicates that the virtual apex is located in front of the face of the transducer array, i.e., below the skin line. Digital control unit 100 may also send an apodization profile over connection 104 to virtual apex scanning preprocessor 106. Preprocessor 106 includes three functional blocks: a transmitter preprocessor 108, a mixer phases preprocessor 110, and a tap selector preprocessor 112. Transmitter preprocessor 108 converts a transmission steering angle $\theta$ and a transmission focal point $f_x$ into a corrected transmission steering angle $\theta_x{}'$ and a corrected transmission focal point $f_x{}'$ in accordance with equations (1) and (2), previously described.

The corrected transmission steering angle and transmission focal point are then processed in accordance with the method described in U.S. Pat. No. 4,949,259, the disclosure of which is hereby incorporated by reference, to generate the coefficients of a third order polynomial $Ax^3 + Bx^2 + Cx + D$ which is a series approximation of the distance formula from a transducer element to the chosen focal point $f_x{}'$. The initial set of coefficients generated by transmitter preprocessor 108 is loaded into a multiple accumulator circuit (MAC) 114 over connections 150A–150D.

In accordance with the method and apparatus described in the aforementioned U.S. Pat. No. 4,949,259, the MAC circuit contains three accumulators operating in parallel to generate the coefficients for the third order polynomial. After the accumulators are preset with the coefficients from transmitter preprocessor 108, they provide a delay value for the first channel to the left (and right) of the array center. Zero delay is assumed at the array center. During transmission, with each successive clock cycle, the value at the output of the third accumulator represents the delay needed for the next channel (i.e., transducer element) along the array. Multiple MAC circuits may be operated in parallel; with four MAC circuits in parallel, for example, all of the coefficients for a given focus, with a 128 element aperture, may be generated in 32 clock cycles (i.e., 2 microseconds).

These coefficients are then loaded into a transmitter mixer control (TRIX) circuit 118 over connection 120. The TRIX circuit contains a number of countdown counters corresponding to the number of elements in the transducer array. A typical TRIX circuit may contain 32 such countdown counters and therefore, for a transducer array having 128 elements, four TRIX circuits would be used. The counters in the TRIX circuits start counting down from their initial counts and, upon reaching their terminal counts, the associated circuitry generates a transmit pulse of the width selected by the apodization signal. A number of gating control lines 122 equal to the number of transducer elements is used to gate a number of high voltage transmit drivers 124 which supply high voltage from power supply 126 to the elements of transducer 10 via selector circuit 128 and connections 131 and 129. The high voltage supplied to each transducer element is turned on for the duration of the pulses on the gating control lines 122. By appropriate preloading of the countdown counters, beam steering during transmission is achieved through the use of different firing times for the transducer elements.

During reception of an ultrasound signal during virtual apex imaging, the signal from each transducer is routed through selector circuits 128 and receive preamplifiers 130. There are as many receive preamplifiers as there are transducer elements. The received signal from each transducer element is provided to a TGC circuit 132 over lines 134. Under control of TGC (time gain compensation) control circuit 136, a TGC generator 138, a clock generator 140, and an apodization generator 142 provide received time gain control and apodization profiles for the received signal. A mixer 146 is used to heterodyne selected clock phases with the received signal under control of a mixer control portion of TRIX circuit 118 via connection 148. Changing the selected phases of the clock signal applied to the received ultrasound signal by mixer 146 performs the dynamic steering and dynamic focusing during function reception. The mixer control portion of TRIX chip 118 receives control signals from MAC 114.

Mixer phases preprocessor 110 uses a received steering angle $\theta$ and a received phase focus $f_p$ and the displacement h to generate a corrected receive steering angle $\theta_p'$ and a corrected phase focus $f_p'$ in accordance with equations (5) and (6), previously described. Receive focusing coefficients for the third order polynomial approximation of the distance noted above are generated by mixer phases preprocessor 110 in accordance with the method described in U.S. Pat. No. 4,949,259 and transmitted over connections 116A–116D to MAC chip 114. Then, in accordance with the method of U.S. Pat. No. 4,949,259, the receive coefficients are updated for each scan line and focal point along the virtual scan line of interest. In this particular implementation, dynamically updating the "B" coefficient of the distance formula dynamically varies the receive steering angle.

The coarse delay for the received signal is controlled by tap selector preprocessor 112, which takes a receive steering angle $\theta$ and receive tap focus $f_T$ and the displacement h and provides a corrected receive steering angle $\theta_T'$ and a corrected tap focal point $f_T'$ in accordance with equations (3) and (4) for the virtual scan line arriving at virtual apex 30. This corrected tap value is transmitted over connection 152 to tap selector 154. Tap selector 154 chooses a tap on a summing delay line 156 or, configures delay line 156 depending upon the particular implementation used to provide an appropriate tap focal point for the arbitrary scan line connecting the tap focal point to the virtual apex. Thereafter, the received signal is processed by image detector/scan converter 158 to generate a usable video image output at terminal 160.

One technical difficulty that arises in the context of virtual apex scanning is an apparent increase in the velocity of sound at the receiving aperture. That is, all of the control calculations use the distance between virtual apex 30 and a transmit or receive focal point. However, in reality, the ultrasound signals are actually, for purposes of analysis, being received and transmitted from an apex 28. Thus, since the time of flight from a transmit or receive focal point is actually shorter to the real apex 28, it will appear to the ultrasound system that ultrasound waves transmitted from virtual apex 30 are actually received before the theoretical path length would predict. Mathematically, this apparent increase in the velocity of sound may be derived as follows. The apparent instantaneous velocity of sound is described by $$C_i = \frac{(C_o)}{2 \cos \phi} \quad (8)$$

where:
$C_i$ = the apparent instantaneous velocity of sound
$C_0$ = actual velocity of sound
$\phi$ = the angle between the tangent of the virtual scan line at a focal point and a line formed between the focal point and the center of mass of the apodization function Equation (8) assumes that the transmit and receive apodization functions are "centered" about the same point, that is the ray defining the transmit scan line and the receive scan line coincide. If this is not the case, then the following equation holds $$C_i = \frac{(C_o)}{\cos(\phi_X) + \cos(\phi_R)} \quad (9)$$

To account for the round trip distance from the transducer to the target and back $$C_i = \frac{2}{\cos(\phi_X) + \cos(\phi_R)} \frac{C_o}{2} \quad (10)$$

where:
2 in the numerator accounts for the round trip distance
$\theta_X$ = transmit angle between the tangent of the virtual scan line at a focal point and a line formed between the focal point and the center of mass of the apodization function
$\phi_R$ = receive angle between the tangent of the virtual scan line at a focal point and a line formed between the focal point and the center of mass of the apodization function The factor by which the velocity of sound apparently increases is $$\alpha = \frac{2}{\cos(\phi_x) + \cos(\phi_R)} \quad (12)$$

Note that $\alpha$ is greater than 1 for any case where $\phi_x$ or $\phi_R$ is not equal to zero. Instantaneous changes in the apparent speed of sound as previously derived can be attributed to either C, D or T dimensions from the well known relationship D=RT where D=distance, T=time, R=rate.

The time adjustment parameter $\alpha$ describes the amount of time by which the received ultrasound pulse apparently arrive more closely spaced in time than they would if virtual apex scanning is not used. This problem is especially acute when operating close to the transducer array face (the near field), that is, where $\phi$ tends to be much larger than zero.

There are several ways of compensating for this phenomenon. Digital control unit 100 and image detector/scan converter 158 may be programmed to perform aperiodic time sampling such that each time sample corresponds to one depth resolution. Alternatively, periodic time sampling may be used such that the sampled depth increments are changed, i.e., from coarse to fine during sampling and then the scan converter may be reprogrammed to compensate for the changing sampling intervals to correctly place the radial samples in the image. Finally, digital control unit 100 can be programmed to decrease the amount of delay applied to the signal as the echo is being received.

The present invention has been used to produce images where the virtual apex is placed at a distance h equal to ½ the length of the transducer array behind the transducer array and high quality images have been produced.

Having thus described one particular embodiment of the invention, various alterations, modifications, and improvements will readily occur to those skilled in the art. For example, although dynamic steering has been illustrated using only the phases of the mixers, it could also be accomplished using only the delays supplied by the delay line or by a combination of phase selection and delay selection. The present invention may also be used to focus during reception even though the transmit beam has a different trajectory. The present invention can also be used in conjunction with color flow techniques, two dimensional anatomical information techniques, acoustic quantification (tissue identification), Doppler techniques, parallel processing techniques, and scan line splicing techniques. The present invention is not limited to linearly organized arrays, but can operate with any transducer probe configuration. In addition, the present invention is useful with a variety of other focusing algorithms, such as spherical or elliptical focusing. Furthermore, although the invention has been specifically illustrated with the virtual apex located on a center line of the transducer array, the invention is not so limited. The virtual apex may be disposed in any location that is not on the face of the transducer array. Such alterations, modifications, and improvements as are made obvious by this disclosure are intended to be part of this disclosure thought not expressly stated herein, and are intended to be within the spirit and scope of the invention. Accordingly, the foregoing description is by way of example only is not intended as limiting. The invention is limited only as defined in the following claims and equivalents thereto.

What is claimed is:

1. A phased array ultrasonic imaging system, comprising:
    a transducer array for transmitting pulses of ultrasound energy in a transmitting mode and for receiving reflected ultrasound energy in a receiving mode;
    a transmit control circuit, coupled to and controlling the transducer array, for selecting an angle and a focus to steer a transmitted pulse of ultrasound energy in a desired direction in the transmitting mode; and
    a receive focusing circuit, coupled to the transducer array, for dynamically varying a receive steering angle and focus in real time during reception of ultrasound energy to focus the received ultrasound energy along at least one virtual scan line that is not required to pass through a center of mass of an applied apodization function.

2. The phased array ultrasonic imaging system of claim 1, wherein the receive focusing circuit varies the receive steering angle continuously during reception.

3. The phased array ultrasonic imaging system of claim 1, wherein the receive focusing circuit varies the receive steering angle in discrete increments corresponding to zones along the at least one virtual scan line.

4. The phased array imaging system of claim 1, wherein the at least one virtual scan line originates at a virtual apex that is disposed at location other than on a face of the transducer array.

5. The phased array imaging system of claim 1, wherein the virtual apex is disposed behind the face of the transducer array.

6. The phased array imaging system of claim 1, wherein the virtual apex is disposed in front of the face of the transducer array.

7. The phased array imaging system of claim 1, further comprising means for generating an ultrasound image having a sector format including circuitry for successively activating the transmit control circuit and the receive focusing circuit to create a plurality of focused points of ultrasound energy along scan lines and a scan converter to convert the focused points into a viewable image.

8. A phased array ultrasonic imaging system, comprising:
    a transducer array for transmitting pulses of ultrasound energy in a transmitting mode and for receiving reflected ultrasound energy in a receiving mode;
    a transmit control circuit, coupled to and controlling the transducer array, for selecting an angle and a focus to steer a transmitted pulse of ultrasound energy in a desired direction in the transmitting mode;
    a receive focusing circuit, coupled to the transducer array, for dynamically varying a receive steering angle and focus in real time during reception of ultrasound energy to focus the received ultrasound energy along at least one virtual scan line that is not required to pass through a center of mass of an applied apodization function; and
    an apodization circuit coupled to and controlling the transducer array to provide an arbitrary apodization profile in at least one of the transmitting mode and the reception mode.

9. A phased array ultrasonic imaging system, comprising:
  a transducer array for transmitting pulses of ultrasound energy in a transmitting mode and for receiving reflected ultrasound energy in a receiving mode;
  a transmit control circuit, coupled to and controlling the transducer array, for selecting an angle and a focus to steer a transmitted pulse of ultrasound energy in a desired direction in the transmitting mode;
  a receive focusing circuit, coupled to the transducer array, for dynamically varying a receive steering angle and focus in real time during reception of ultrasound energy to focus the received ultrasound energy along at least one virtual scan line that is not required to pass through a center of mass of an applied apodization function; and
  wherein the transmitter control circuit includes means for selecting an angle and a focus according to $$f_x' = [(f_{x0}+h)^2 + h^2 - 2(f_{x0}+h)h \cos \theta_x]^{\frac{1}{2}}$$

$$\sin \theta_x' = \frac{(f_{x0}+h)}{f_x'} \sin \theta_x$$

where:
  $f_x'$ = a corrected focus depth for a line originating at the virtual apex but that is actually transmitted from an apex on the face of the transducer array,
  $f_{x0}$ = a focus depth for a transmitted scan line originating at the apex on the face of the transducer array,
  h = a displacement of the virtual apex from a center of the face of the transducer array,
  $\theta_x$ = a steering angle between a transmitted scan line normal to the transducer array and originating at the apex on the face of the transducer array and the line originating at the virtual apex, and
  $\theta_x'$ = a corrected steering angle for a transmitted scan line originating at the apex on the face of the transducer array.

10. A phased array ultrasonic imaging system, comprising:
  a transducer array for transmitting pulses of ultrasound energy in a transmitting mode and for receiving reflected ultrasound energy in a receiving mode;
  a transmit control circuit, coupled to and controlling the transducer array, for selecting an angle and a focus to steer a transmitted pulse of ultrasound energy in a desired direction in the transmitting mode;
  a receive focusing circuit, coupled to the transducer array, for dynamically varying a receive steering angle and focus in real time during reception of ultrasound energy to focus the received ultrasound energy along at least one virtual scan line that is not required to pass through a center of mass of an applied apodization function; and
  wherein the receive focusing circuit includes a mixer for heterodyning selected phases of a clock signal with a received ultrasound signal coupled to a delay circuit having a selector for selecting an amount of time delay to be added to a phase delay provided by the mixer.

11. The phased array imaging system of claim 10, wherein phases of the clock signal are selected according to $$f_p' = [(f_{p0}+h)^2 + h^2 - 2(f_{p0}+h)h \cos \theta_p]^{\frac{1}{2}}$$

$$\sin \theta_p' = \frac{(f_{p0}+h)}{f_p'} \sin \theta_p$$

where:
  $f_p'$ = a corrected phase delay for a received virtual scan line arriving at the virtual apex but that actually arrives at an apex on the face of the transducer array,
  $f_{p0}$ = a phase delay for a received scan line arriving at the apex on the face of the transducer array,
  h = a displacement of the virtual apex from a center of the face of the transducer array,
  $\theta_p$ = a steering angle between a received scan line normal to the transducer array and intersecting the apex on the face of the transducer array and the received virtual scan line arriving at the virtual apex, and
  $\theta_p'$ = a corrected steering angle for a received virtual scan line arriving at the virtual apex.

12. The phased array imaging system of claim 11, wherein the time delay is selected according to $$f_T' = [(f_{T0}+h)^2 + h^2 - 2(f_{T0}+h)h \cos \theta_T]^{\frac{1}{2}}$$

$$\sin \theta_T' = \frac{(f_{T0}+h)}{f_T'} \sin \theta_T$$

where:
  $f_T'$ = a corrected time delay for a received virtual scan line arriving at the virtual apex but that actually arrives at an apex on the face of the transducer array,
  $f_{T0}$ = a time delay for a received scan line arriving at the apex on the face of the transducer array,
  h = a displacement of the virtual apex from a center of the face of the transducer array,
  $\theta_T$ = a steering angle between a received scan line normal to the transducer array and intersecting the apex on the face of the transducer array and the received virtual scan line arriving at the virtual apex, and
  $\theta_T'$ = a corrected steering angle for a received virtual scan line arriving at the virtual apex.

13. The phased array imaging system of claim 12, wherein the receive focusing circuit dynamically selects phases of the clock signal during reception to vary the receive steering angle and focus in real time.

14. The phased array imaging system of claim 13, further comprising means for compensating for an apparent increase in a speed of sound of the received ultrasound energy in the direction along the virtual scan line originating at the virtual apex.

15. In a phased array ultrasonic imaging system for generating ultrasound images from received ultrasound energy detected by a transducer array, a method of processing received ultrasound energy to provide focused ultrasound images comprising dynamically varying a receive steering angle and focus in real time during reception of ultrasound energy to focus the received ultrasound energy along at least one virtual scan line that is not required to pass through a center of mass of an applied apodization function.

16. The method of claim 15, wherein dynamically varying a receive steering angle and focus includes varying the receive steering angle continuously during reception.

17. The method of claim 15, wherein dynamically varying a receive steering angle and focus includes varying the receive steering angle in discrete increments corresponding to zones along the at least one virtual scan line.

18. In a phased array ultrasonic imaging system for generating ultrasound images from received ultrasound energy detected by a transducer array, a method of processing received ultrasound energy to provide focused ultrasound images comprising dynamically varying a receive steering angle and focus in real time during reception of ultrasound energy to focus the received ultrasound energy along at least one virtual scan line that is not required to pass through a center of mass of an applied apodization function, wherein the receive steering angle and focus are varied by selecting phases of a clock signal according to $$f_p' = [(f_{p0}+h)^2 + h^2 - 2(f_{p0}+h)h \cos \theta_p]^{\frac{1}{2}}$$

$$\sin \theta_p' = \frac{(f_{p0} + h)}{f_p'} \sin \theta_p$$

where:
- $f_p'$ = a corrected phase delay for a received virtual scan line arriving at the virtual apex but that actually arrives at an apex on the face of the transducer array,
- $f_{p0}$ = a phase delay for a received scan line arriving at the apex on the face of the transducer array,
- $h$ = a displacement of the virtual apex from a center of the face of the transducer array,
- $\theta_p$ = a steering angle between a received scan line normal to the transducer array and intersecting the apex on the face of the transducer array and the received virtual scan line arriving at the virtual apex, and
- $\theta_p'$ = a corrected steering angle for a received virtual scan line arriving at the virtual apex.

19. The method of claim 18, further comprising apodizing the received ultrasound energy during reception.

20. A circuit for focusing ultrasound energy received by a transducer array, comprising:
- means for dynamically varying a receive steering angle in real time during reception of ultrasound energy; and
- means for dynamically varying a receive focus in real time during reception of ultrasound energy;
- so that the received ultrasound energy is focused along at least one virtual scan line that is not required to pass through a center of mass of an applied apodization function.

* * * * *